(12) United States Patent
Illendula et al.

(10) Patent No.: US 8,161,226 B2
(45) Date of Patent: Apr. 17, 2012

(54) METHODS AND APPARATUS TO SHARE A THREAD TO RECLAIM MEMORY SPACE IN A NON-VOLATILE MEMORY FILE SYSTEM

(75) Inventors: Ajith K. Illendula, Albuquerque, NM (US); Philip F. Low, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 24 days.

(21) Appl. No.: 11/318,868

(22) Filed: Dec. 27, 2005

(65) Prior Publication Data

US 2007/0150691 A1 Jun. 28, 2007

(51) Int. Cl.
*G06F 12/02* (2006.01)

(52) U.S. Cl. .................. 711/103; 711/E12.009

(58) Field of Classification Search .......... None
See application file for complete search history.

(56) References Cited

U.S. PATENT DOCUMENTS

| | | | | |
|---|---|---|---|---|
| 5,778,168 A | * | 7/1998 | Fuller | 714/18 |
| 5,778,391 A | * | 7/1998 | Fisher et al. | 707/204 |
| 5,870,757 A | * | 2/1999 | Fuller | 707/201 |
| 6,021,414 A | * | 2/2000 | Fuller | 707/202 |
| 7,155,486 B2 | * | 12/2006 | Aoshima et al. | 709/211 |
| 7,424,643 B2 | | 9/2008 | Atri et al. | |
| 2006/0129508 A1 | * | 6/2006 | Cannon et al. | 707/1 |
| 2006/0242382 A1 | * | 10/2006 | Griess et al. | 711/170 |
| 2006/0294292 A1 | | 12/2006 | Illendula et al. | |

OTHER PUBLICATIONS

Intel Corporation, *Intel® Flash Data Integrator User's Guide*, pp. 7, 11, 16, 17, and 105. Version 7.0, Jul. 18, 2005.

Intel Corporation, *Intel® Flash File System Core Reference Guide*, pp. 12, 14, 19, 64, 89-104, and 125-143. Version 1, Oct. 2004.

* cited by examiner

*Primary Examiner* — Pierre-Michel Bataille
*Assistant Examiner* — Ryan Dare
(74) *Attorney, Agent, or Firm* — Hanley, Flight and Zimmerman, LLC

(57) ABSTRACT

Example methods and apparatus to share a thread to reclaim memory space in non-volatile memory file systems are disclosed. A disclosed example method includes associating a memory reclaim thread with first and second flash memory volumes to reclaim memory space in the first and second flash memory volumes and reclaiming the memory space in at least one of the first and second flash memory volumes via the memory reclaim thread.

26 Claims, 7 Drawing Sheets

| VOLUME NAME | SHARING | SHARED VOLUME(S) | THREAD ID | PRIORITY |
|---|---|---|---|---|
| A | YES | B,C | PTID_1 | 1 |
| B | YES | A,C | PTID_1 | 3 |
| C | YES | A,B | PTID_1 | 2 |
| D | NO | - | PTID_2 | - |

METHODS AND APPARATUS TO SHARE A THREAD TO RECLAIM MEMORY SPACE IN A NON-VOLATILE MEMORY FILE SYSTEM

FIELD OF THE DISCLOSURE

The present disclosure relates generally to processor systems and, more particularly, to methods and apparatus to share a thread to reclaim memory space in a non-volatile memory file system.

BACKGROUND

Processor systems typically include a variety of memory types. For example, processor systems are often provided with non-volatile memories such as magnetic data storage devices, optical data storage devices, solid-state data storage devices, etc. Flash memory is a particular type of non-volatile memory that a processor system can use to store data for a plurality of purposes. Processor systems may use flash memory devices to store program code and data associated with hardware device drivers, operating systems, applications, etc. Flash memory may also be used to implement mass data storage devices (e.g., removable media cards, on-board media storage, etc.).

Flash memory access operations function differently from memory access operations typically used to access other forms of memory such as volatile random access memory (RAM). For example, write operations used to change contents of RAM may be performed relatively quickly by specifying the write operation, a target address, and data to be written. A processor executes the RAM write operation by selecting the specified address and setting the bits in the data space corresponding to that address with the provided data. Changing contents in a RAM type of memory may be done, for example, by changing a bit from '0' to '1' or from '1' to '0' depending on the previous contents of the data space and the data to be written to the data space.

Writing data to flash memory devices involves a different process from that used to write data to RAM memory devices. Specifically, flash memory devices require erasing invalid contents of a data space (e.g., setting all bits to '1') or contents of a data space previously indicated as deleted before writing data into the data space. Flash memory devices are typically organized into blocks of memory (e.g., 64 k-byte blocks). Erase operations require erasing an entire block of memory, regardless of the amount of memory within that block to which a program (e.g., an operating system, an application, etc.) or user intends to write. Prior to erasing a block of memory, valid data therein is preserved by storing it in a different block of memory.

To decrease the amount of time required to perform a write operation in flash memories, processor systems often periodically or aperiodically execute erase operations to recover or reclaim data space containing data previously indicated by an application as invalid (e.g., a file deleted by a user). The reclaimed data space is then indicated as writeable so that any subsequent write operation can write to the reclaimed data space without first requiring execution of an erase operation.

DETAILED DESCRIPTION

Figure 1:
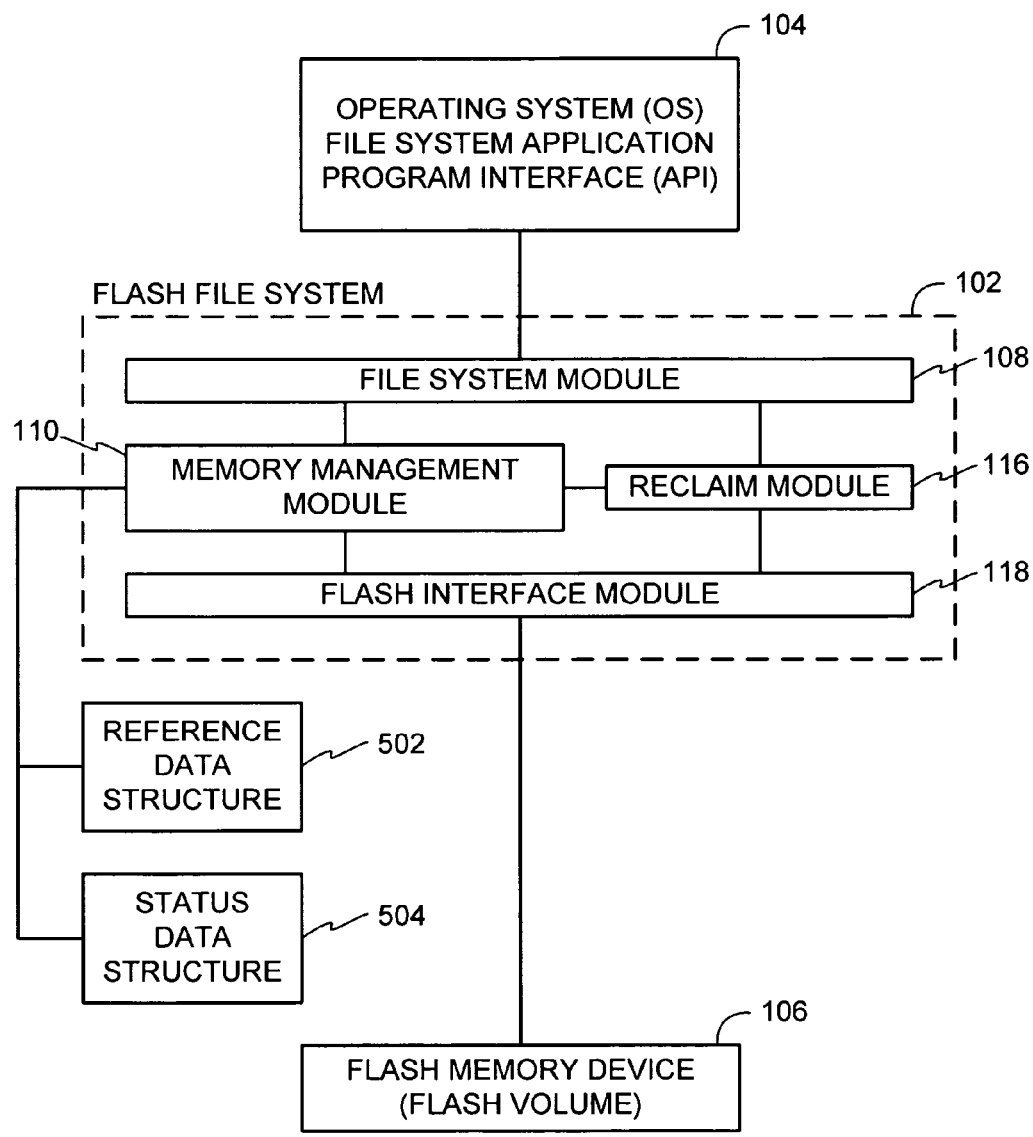
FIG. 1 is an illustration of an example flash file system that may be used to implement the example methods and apparatus described herein.

The example methods and apparatus described herein may be used to share a thread with a plurality of non-volatile memory volumes such as flash memory volumes to perform memory space reclaim operations. Memory space reclaim operations are used to recover memory space containing invalid or previously discarded data (e.g., information that no longer needs to be accessed from particular memory addresses or memory locations) and make the reclaimed memory space available for subsequent writing. Reclaiming memory space involves erasing the memory space (e.g., each memory bit or cell within the memory space needs to be set to '1'). As is well known, during a write operation, when writing information to a flash memory device, the destination bits or cells must first be set to '1' using an erase operation because during a write operation a bit cannot be changed from '0' to '1'. Instead, writing a '1' involves leaving a previously erased bit unchanged (i.e., leaving the value '1' stored in the bit unchanged) and writing a '0' involves changing a bit value from '1' to '0'.

A flash file system is a system used to keep track of the state of a flash memory. The flash file system indicates portions of memory as available or empty space if the portions of memory contain invalid data or have been previously erased. Invalid data may be created in any of a plurality of manners. For example, a portion of memory may be tagged as containing invalid data if a user and/or program has deleted information (e.g., deleted a file) previously stored in that memory portion. To erase portions of flash memory containing invalid data, a processor system executes memory space reclaim operations. In this manner, the erased portions of memory can be efficiently written to in subsequent write operations without requiring additional erasing of the memory.

Processor systems often execute reclaim operations using threads (e.g., operating system process threads). Unlike traditional systems that require starting a new memory reclaim thread (i.e., a thread to perform reclaim operations) each time a flash memory volume is mounted (i.e., a reclaim thread for each memory volume), the example methods and apparatus described herein can be used to share a memory reclaim thread with a plurality of flash memory volumes. As a result, a new thread need not be started each time a flash memory volume is mounted, but instead a single reclaim thread may be used to perform reclaim operations for a plurality of flash memory volumes. The example methods and apparatus described herein may be used to implement systems requiring relatively less reclaim threads than required in traditional systems, thus increasing system performance by using relatively less system resources to perform the reclaim operations.

The reclaim threads described herein may be implemented using background threads or foreground threads. A background thread may perform one or more reclaim operations when a processor system (e.g., the processor system 910 of FIG. 9) has been idle for a predetermined amount of time to recover memory space containing invalid data and create erased memory space that can be readily available to subsequently initiated write instructions. During a write operation, a flash file system may use any suitable algorithm to find a large enough amount of erased memory space to hold a particular amount of data provided via a pending write instruction. For example, the flash file system may use a known first fit technique or a known best fit technique to find sufficient erased memory space. If the flash file system does not find sufficient erased memory space to store data provided via a pending write instruction, a foreground thread may perform a reclaim operation to create the required amount of erased memory space.

FIG. 1 illustrates an example flash file system 102 that may be used to implement the example methods and apparatus described herein. The flash file system 102 of the illustrated example is communicatively coupled to an operating system (OS) file system application program interface (API) 104 and a flash memory device 106 (i.e., a flash memory volume). The flash memory device 106 may be a NOR flash memory device or a NAND flash memory device. For instance, the flash memory device 106 may be implemented using an Intel StrataFlash® device such as, for example, the Intel StrataFlash® J3 sold by Intel® Corporation of Santa Clara, Calif. Of course, the flash memory device 106 may be implemented using any other type of flash device including flash devices sold by companies other than Intel. In addition, the flash memory device 106 may be used to implement a removable media such as, for example, a compact flash memory card, a multi-media memory card (an "MMC"), a secure digital ("SD") card, a Memory Stick®, etc. The flash memory device 106 may additionally or alternatively be used to implement non-removable media such as, for example, on-board memory or integrated chip ("IC") embedded memory. Although the example methods and apparatus are described herein in connection with flash memory, in some example implementations the example methods and apparatus described herein may be implemented in connection with memory device types other than flash memory such as, for example, optical memory, magnetic memory, other solid-state or transistor-based memory, etc.

In general, the example OS file system API 104 of FIG. 1 provides users and/or applications with functions or instructions to access (e.g., read, write, erase, copy, etc.) information in the flash memory device 106. The flash file system 102 translates instructions obtained from the OS file system API 104 into flash-memory-specific instructions that can be used to communicate with and control the flash memory device 106 to perform the operations indicated by the instructions obtained from the OS file system API 104. For example, if the OS file system API 104 communicates a write instruction to the flash file system 102, the flash file system 102 may first identify memory space into which data can be written, perform an erase operation if the identified memory space has not previously been erased via, for example, a reclaim operation, and then perform a write operation to write the received information to the reclaimed memory space.

To erase portions of the flash memory device 106 including invalid data, a reclaim thread may cause the example flash file system 102 of FIG. 1 to perform one or more reclaim operations to erase any portion(s) of the flash memory device 106 tagged or otherwise indicated as having invalid data. Reclaim threads may operate as foreground threads or background threads, or they may be manually controlled.

A foreground reclaim may be performed, for example, by causing the flash file system 102 to perform one or more reclaim operations any time a write instruction is obtained from the OS file system API 104 and there is no erased memory space available for writing. In this case, the flash file system 102 uses one or more reclaim operations to erase sufficient memory space in the flash memory device 106 to store the information obtained from the OS file system API 104 via the write instruction.

A background reclaim thread may cause the flash file system 102 to perform one or more reclaim operations periodically or aperiodically when, for example, a processor system (e.g., the processor system 910 of FIG. 9) has been idle for a predetermined amount of time (e.g., when no processing activity has occurred for a predetermined amount of time). In this case, one or more reclaim operations search for any invalid memory spaces created since the last time the flash file system 102 performed a reclaim operation and reclaim those memory spaces.

A manual reclaim occurs in response to a user initiating a reclaim operation to create erased memory space for future write operations. The user may manually initiate a reclaim operation whenever the user deletes a data (e.g., deletes a file) or at any other time at the user's discretion.

To provide users and/or programs with instructions which may be used to access and control the flash memory device 106, the example flash file system 102 of FIG. 1 includes a file system module 108. The example file system module 108 of FIG. 1 translates instructions obtained from the OS file system API 104 into flash memory instructions that can be used to access and control the flash memory device 106. For example, the instructions may include read instructions, write instructions, file/directory rename instructions, delete instructions, move instructions, etc. The example file system module 108 also provides an interface for a thread (e.g., a reclaim thread) to communicate with the OS file system API 104 and/or program applications that use the OS file system API 104. For example, a thread may communicate messages to the OS file system API 104 indicating a particular operation is complete.

Figure 2:
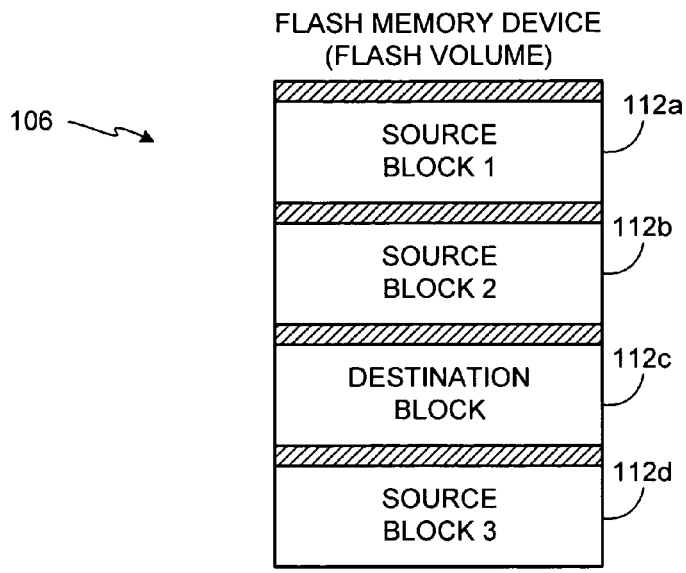
FIG. 2 is an illustration of an example flash memory volume that may reside in an example flash memory device.

To manage allocation of memory space within a flash memory volume (e.g., the flash memory device 106), the example flash file system 102 of FIG. 1 is provided with a memory management module 110 that is communicatively coupled to the file system module 108. The example memory management module 110 of FIG. 1 tracks and/or manages the memory space status (e.g., invalid data, valid data, reclaimed space, etc.) of flash memory volumes such as, for example, the flash memory device 106. As shown in FIG. 2, the example flash memory device 106 of FIG. 1 is divided into a plurality of memory blocks 112a, 112b, 112c, and 112d. The example memory management module 110 tracks the memory space status in each of the memory blocks 112a-d by generating information (e.g., memory management data structures) indicative of which of the memory blocks 112a-d contain available or free memory space ready for writing, and which of the memory blocks 112a-d have invalid memory space or dirty memory space requiring a reclaim operation.

Figure 3:
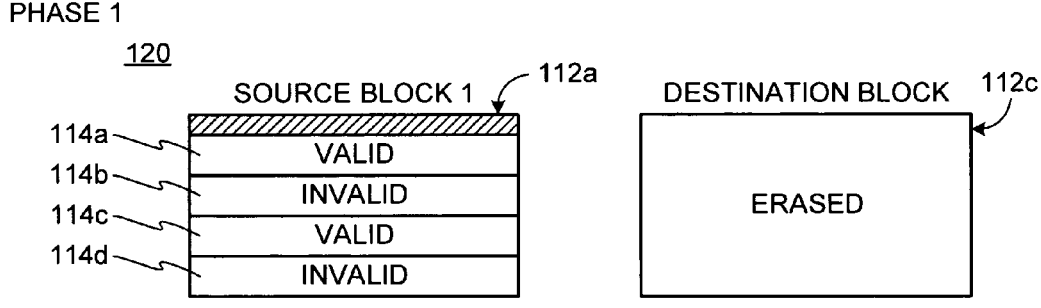
FIG. 3 illustrates example phases in an example memory space reclaim process.
Figure 3:
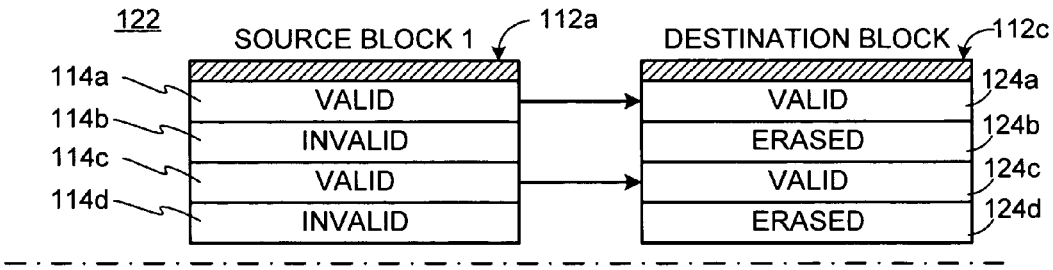
Figure 3:
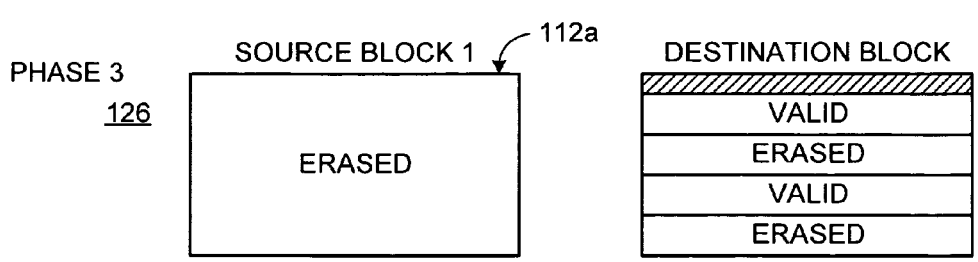

In the example implementation illustrated herein, the memory management module 110 assigns a value (e.g., a logical block number) to each of the memory blocks 112a-d within the flash memory device 106, divides each of the memory blocks 112a-d into a plurality of logical units 114a-d as shown in FIG. 3, and associates a logical unit identifier (e.g., an address range or address offset) with each of the logical units 114a-d to track its status (e.g., valid data, invalid data, or available for writing). During a reclaim operation, the memory management module 110 can be used to determine which of the memory blocks 112a-d and which of the logical units 114a-d therein contain invalid information and require reclaiming.

To initiate or perform reclaim operations, the example flash file system 102 of FIG. 1 is provided with a reclaim module 116 that is communicatively coupled to the example memory management module 110 and the example file system module 108. The example reclaim module 116 may be controlled by one or more reclaim threads. As described in detail below in connection with FIG. 3, the example reclaim module 116 initiates reclaim operations to reclaim memory space by copying valid data from a source block to a previously erased destination block, and by then erasing the source block, which may subsequently be used as a destination block during another reclaim operation. By copying to the destination block only the valid data, memory space in the destination block corresponding to invalid data in the source block remains erased (e.g., set to '1') and ready for subsequent writing. The reclaim module 116 of the illustrated example communicates with the memory management module 10 to determine which memory blocks contain invalid data and to ensure that the memory management module 110 tracks reclaimed memory space after each reclaim operation.

To interface with the flash memory device 106, the flash file system 102 of the illustrated example includes a flash interface module 118 that is communicatively coupled to the example memory management module 110 and the example reclaim module 116. The example flash interface module 118 of FIG. 1 causes low-level and/or hardware level instructions to be issued to the flash memory device 106 to perform the operations indicated by instruction(s) obtained from the OS file system API 104 and/or operations indicated by the memory management module 110 and/or the reclaim module 116. For example, if a reclaim thread causes the reclaim module 116 to initiate or perform a reclaim operation, the flash interface module 118 may cause the flash memory device 106 to perform a plurality of read operations (e.g., reading valid data from a source block), a plurality of write operations, (e.g., writing the valid data to a destination block), and/or an erase operation (e.g., erasing the source block).

In the example of FIG. 2, the memory blocks 112a, 112b, and 112d are source blocks and the memory block 112c is a destination block. As shown in FIG. 3, the destination block 112c contains erased memory space or memory space available for writing. During a reclaim operation, the example reclaim module 116 of FIG. 1 may reclaim invalid memory space in one of the source blocks 112a, 112b, and 112d by copying the valid data stored therein to the destination block 112c as shown in phase 2 of FIG. 3. In the illustrated example of FIG. 3, the reclaim module 116 performs a reclaim operation on the source block 112a to reclaim memory space in the logical units 114b and 114d (which hold invalid data) while preserving the valid data stored in the logical units 114a and 114c.

During a first example phase 120 of an example reclaim operation shown in FIG. 3, the example reclaim module 116 of FIG. 1 obtains memory status information from the example memory management module 110 of FIG. 1 to determine if the source block 112a contains invalid data in the logical units 114b and 114d. During a second example phase 122, the example reclaim module 116 causes the example flash interface module 118 of FIG. 1 to read the valid data from the logical units 114a and 114c and write the valid data to respective logical units 124a and 124c of the destination block 112c. In this manner, memory space in logical units 124b and 124d, corresponding to logical units 114b and 114d, contain erased memory space available for writing. In some example implementations, the valid data stored in the logical 124a and 124c may instead be re-organized or repacked in logical units 124a and 124b so that a larger contiguous portion of erased memory resides in the logical units 124c and 124d.

During a third example phase 126, the example reclaim module 116 causes the flash interface module 118 to issue an erase instruction to erase the source block 112a. During a subsequent reclaim operation, the source block 112a may be used as a destination block analogously to the manner in which the destination block 112c was employed above.

Figures 4, 5:
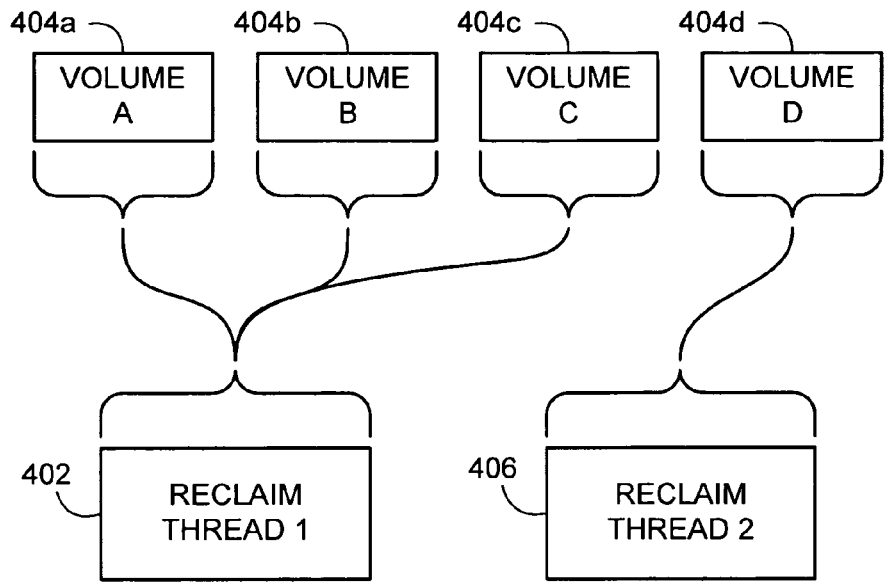
FIG. 4 depicts an example manner in which a memory space reclaim thread may be associated with a plurality of flash memory volumes to perform reclaim operations thereon.
FIG. 5 illustrates an example data structure that may be used to associate a memory reclaim thread with a plurality of flash memory volumes.

FIG. 4 depicts an example manner in which a reclaim thread 402 may be associated with a plurality of flash memory volumes 404a-c to perform reclaim operations thereon. In particular, unlike traditional systems that require associating a single thread to a single flash memory volume, the reclaim thread 402 may be associated with a plurality of flash memory volumes 404a-c as shown in FIG. 4, and may be used to perform reclaim operations (as described above in connection with FIG. 3) on all of the plurality of flash memory volumes 404a-c. In some example implementations, the example apparatus and methods described herein may be used to associate one or more reclaim threads with a plurality of flash memory volumes (e.g., the reclaim thread 402 assigned to the plurality of flash memory volumes 404a-c) and associate one or more other reclaim threads with only one respective flash memory volume. For example, as shown in FIG. 4, while the reclaim thread 402 is assigned to perform memory reclaim operations on three flash memory volumes 404a-c, another reclaim thread 406 is assigned to perform reclaim operations on only one flash memory volume 404d.

Each of the flash memory volumes 404a-d may be substantially similar or identical to the flash memory device 106 of FIG. 1. Alternatively, some of the flash memory volumes 404a-d may be different from one another. For example, some of the flash memory volumes 404a-d may be removable media (e.g., memory cards or jump drives) while others of the flash memory volumes may be on-board or embedded memory. Additionally, the flash memory volumes may differ based on technology (e.g., NOR flash, NAND flash, etc.) or memory density (e.g., storage capacity).

In the illustrated example of FIG. 4, the example memory management module 110 and/or the example reclaim module 116 of FIG. 1 track, manage, or otherwise store the status indicating which of the reclaim threads 402 and 406 is assigned to, or associated with, which of the flash memory volumes 404a-d. In an example implementation, to store the status of associations between the reclaim threads 402 and 406 and the flash memory volumes 404a-d, the memory management module 110 and/or the reclaim module 116 may use an association data structure such as the example data structure 500 depicted in FIG. 5. The example memory management module 110 and the example reclaim module 116 may use two data structures 502 and 504 as shown in FIG. 1 that are substantially similar or identical to the association data structure 500 shown in FIG. 5.

In the example of FIG. 1, the reference data structure 502 is used to store reference information indicative of which of the flash memory volumes 404a-d should share reclaim threads when mounted. On the other hand, the status data structure 504 is used to store status information indicative of which of the flash memory volumes 404a-d are currently mounted (e.g., installed in and/or provided on a processor platform) and whether they have been associated with a shared reclaim thread. When one of the flash memory volumes 404a-d is mounted to the flash file system 102, the example memory management module 110 accesses the reference data structure 502 to determine whether the mounted flash memory volume is designated to share a reclaim thread with other flash memory volumes, and then writes information to the status data structure 504 indicating that the mounted flash memory volume has been associated with a particular reclaim thread. In some example implementations, the reference data structure 502 contains information indicating that any flash memory device, when mounted to a particular flash interface (e.g., a universal serial bus ("USB") port memory card slot on a computer or mobile media device), should share a reclaim thread with other mounted flash memory volumes. In this manner, the memory slot or other interface to which a flash memory device is mounted indicates whether the flash memory device should share a reclaim thread.

The data structures 502 and 504 may be stored in any suitable location. For example, the data structures 502 and 504 may be stored in a system memory (e.g., the system memory 924 of the processor system 910 FIG. 9) or in any other storage device (e.g., the mass storage memory 925 of FIG. 9) communicatively coupled to the flash file system 102.

In an example implementation, if the memory management module 110 obtains information indicating that the flash memory volume 404a is mounted and is to share a reclaim thread, the memory management module 110 stores the volume name (e.g., 'A') in a volume name column 506 of the status data structure 504 and stores information (e.g., sets a flag indicating 'YES') in a sharing column 508 indicating the flash memory volume 'A' 404a shares a reclaim thread. The memory management module 110 of the illustrated example also stores the volume names (e.g., 'B' and 'C') in a shared volumes column 510 indicating that the flash memory volume 'A' 404a shares a reclaim thread with the mounted flash memory volumes 'B' and 'C' (e.g., 404b and 404c). In addition, the memory management module 110 of the illustrated example stores the thread identification 'PTID$_{13}$1' of the reclaim thread 402 assigned to or associated with the flash memory volumes 404a-c in the thread ID column 512.

In some example implementations, the flash memory volume 404a may be designated to share a reclaim thread with only particular volumes. For example, the flash memory volume 404a may be designated to share a reclaim thread with the flash memory volume 'B' 404b, but not with the flash memory volume 'C' 404c. In this case, when the flash memory volume 404a is mounted, the volume name (e.g., 'B') of the flash memory volume 404b is stored in the entry of the shared volume(s) column 510 corresponding to the flash memory volume 404a. However, the volume name (e.g., 'C') of the flash memory volume 404c is not stored in that entry of the shared volume(s) column 510 because the flash memory volume 404a is not designated to share a reclaim thread with the flash memory volume 404c.

During operation, the example memory management module 110 and/or the example reclaim module 116 prioritizes each of the flash memory volumes 404a-c to determine the order in which the reclaim thread 402 should perform reclaim operations on the flash memory volumes 404a-c (i.e., the order in which each of the flash memory volumes 404a-c is serviced by the shared reclaim thread). The memory management module 110 of the illustrated example may prioritize the flash memory volumes 404a-c based on one or more criteria. In the illustrated example, the memory management module 110 stores priority values in the priority column 514 of the data structure 500. For example, if one of the flash memory volumes 404a-c is a critical system memory, it may be assigned the highest priority. If one of the flash memory volumes 404a-c is a removable media card (e.g., for storing music and/or videos), it may be assigned a relatively low priority. Information on which to base prioritization may be stored in the system memory 924 of FIG. 9 or in any other storage device communicatively coupled to the flash file system 102. In alternative example implementations, the reclaim thread 402 may perform reclaim operations on the flash memory volumes 404a-c using a round-robin-like scheme in which each flash memory volume 404a-c is processed in turn without giving any relative preference or priority to any one of the flash memory volumes 404a-c.

Figure 6:
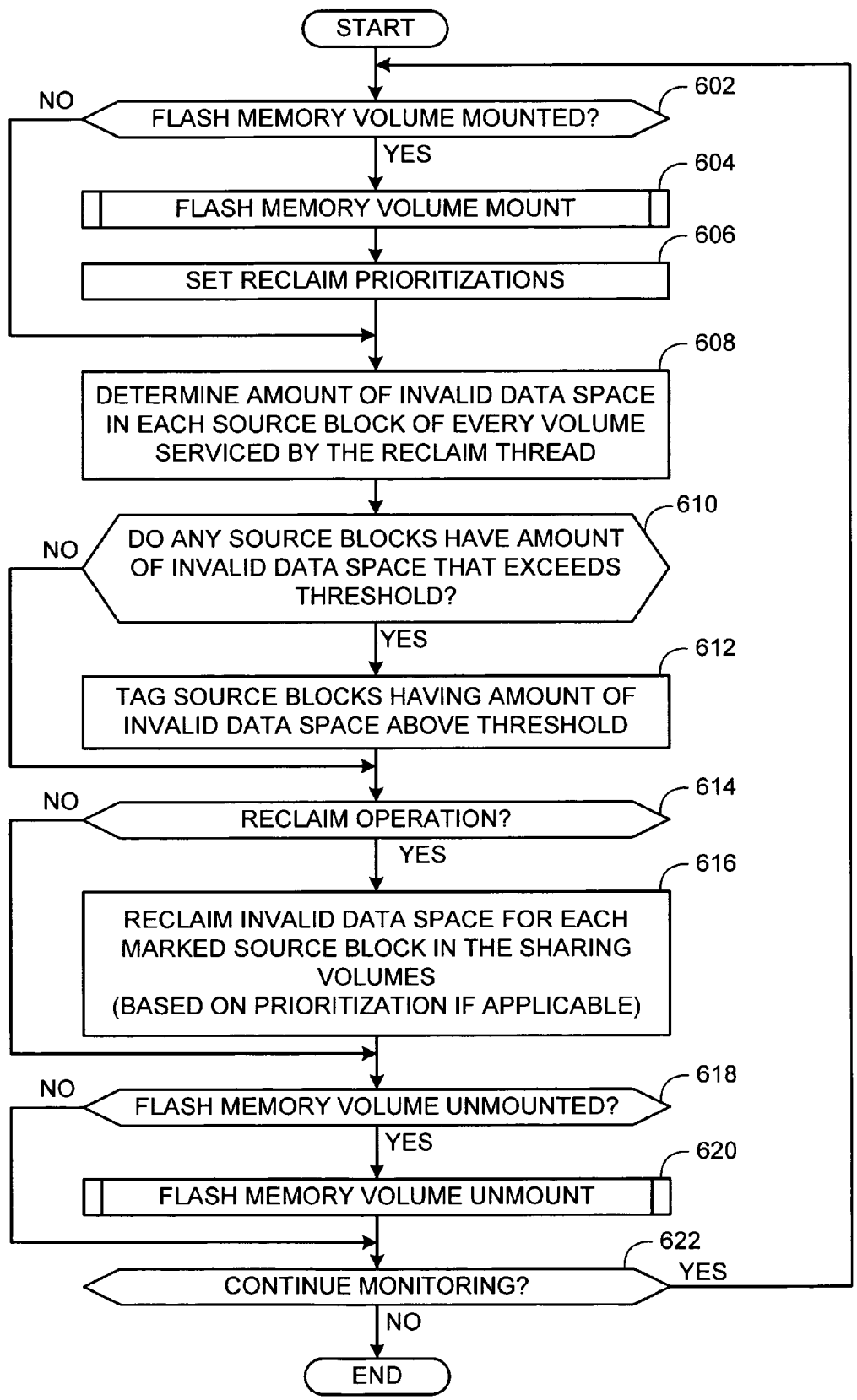
FIG. 6 is a flow diagram representative of example machine readable instructions that may be used to implement the example methods and apparatus described herein.
Figure 7:
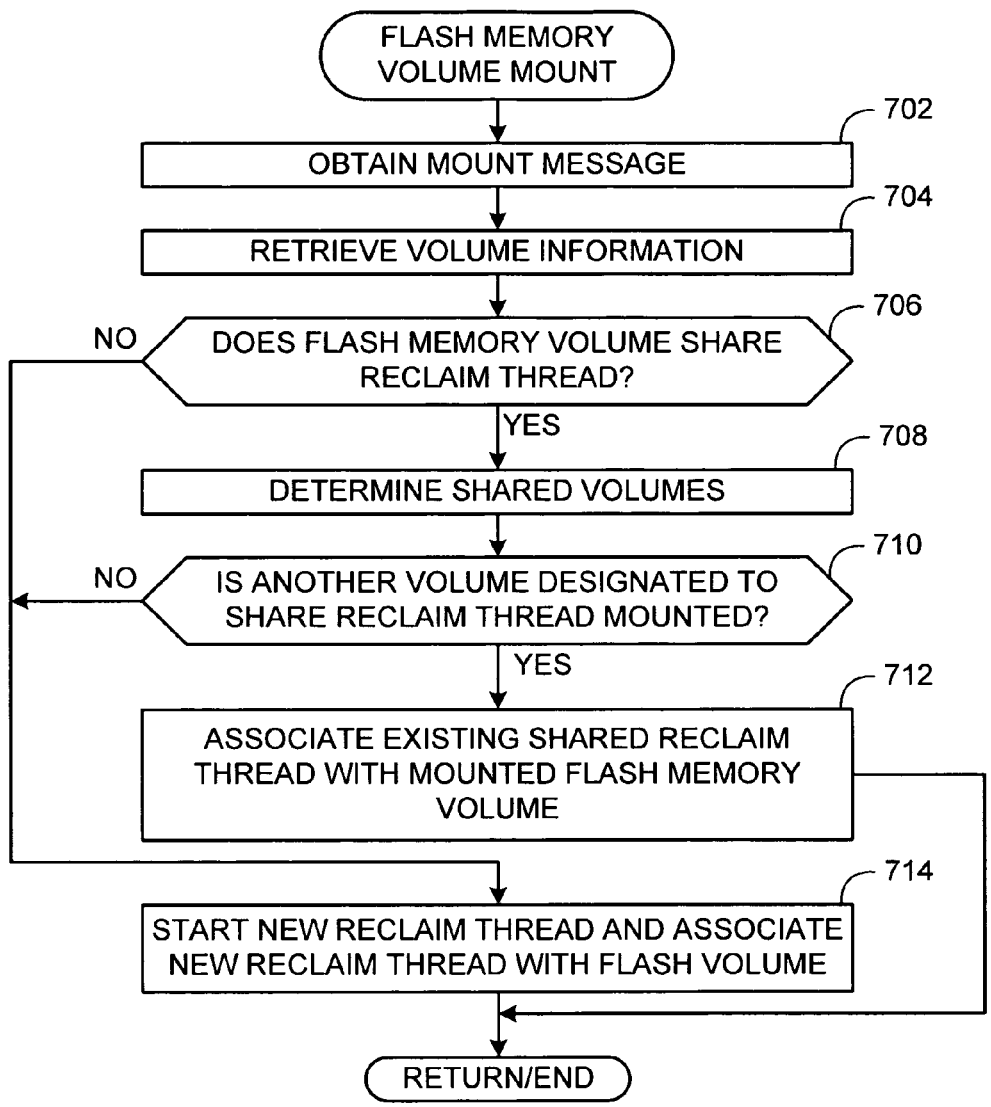
FIG. 7 is a flow diagram representative of example machine readable instructions that may be used to implement an example flash memory volume mount process in connection with the flow diagram of FIG. 6.
Figure 8:
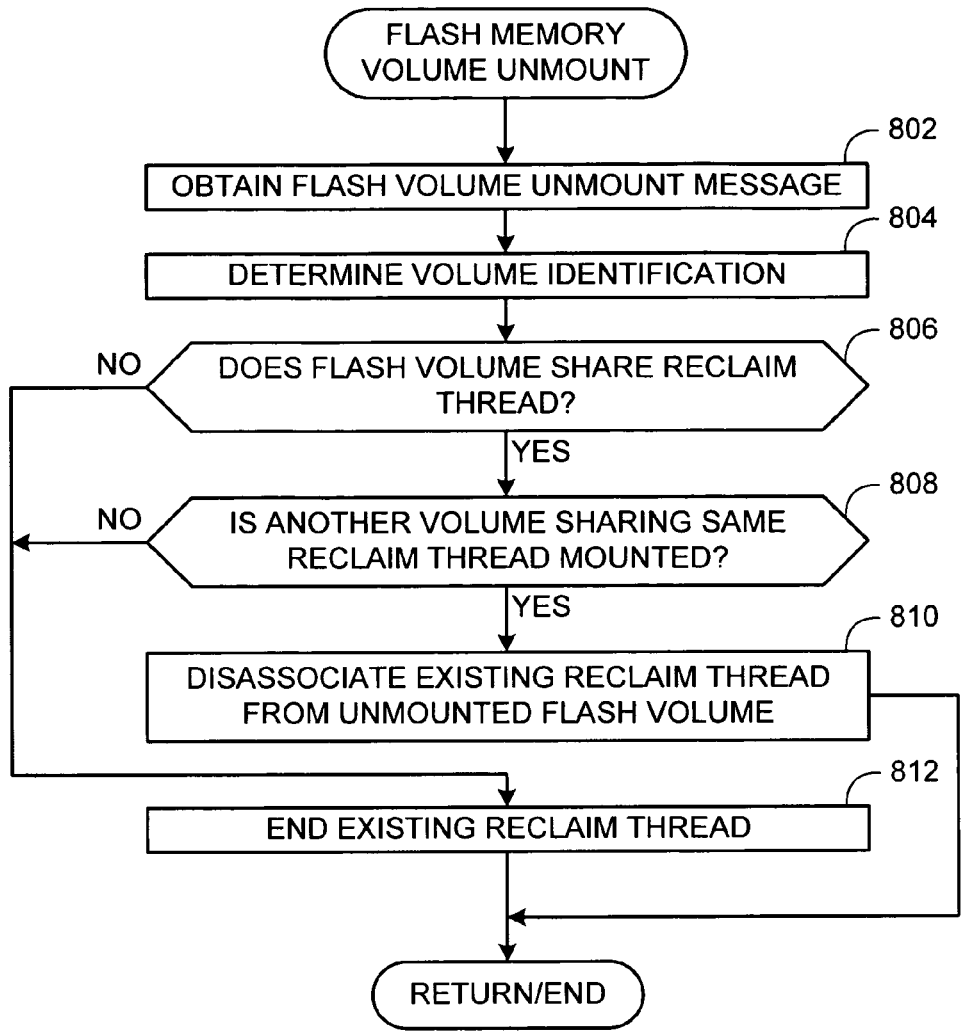
FIG. 8 is a flow diagram representative of example machine readable instructions that may be used to implement an example flash memory volume unmount process in connection with the flow diagram of FIG. 6.

Flowcharts representative of example machine readable instructions for implementing the example flash file system 102 of FIG. 1 are shown in FIGS. 6-8. In these examples, the machine readable instructions comprise a program for execution by a processor such as the processor 912 shown in the example processor system 910 of FIG. 9. The program may be embodied in software stored on a tangible medium such as a CD-ROM, a floppy disk, a hard drive, a digital versatile disk (DVD), or a memory associated with the processor 912 and/or embodied in firmware and/or dedicated hardware in a well-known manner. For example, any or all of the file system module 108, the memory management module 110, the reclaim module 116 and/or the flash interface module 118 of FIG. 1 could be implemented by software, hardware, and/or firmware. Further, although the example program is described with reference to the flowcharts illustrated in FIGS. 6-8, persons of ordinary skill in the art will readily appreciate that many other methods of implementing the example system 102 may alternatively be used. For example, the order of execution of the blocks may be changed, and/or some of the blocks described may be changed, eliminated, or combined.

Initially, the flash file system 102 determines if a flash memory volume (e.g., one of the flash memory volumes 404a-d of FIG. 4) has been mounted (block 602). For example, the flash file system 102 may determine that a flash memory volume has been mounted if it receives a message or some other information (e.g., an interrupt) indicating that a flash memory volume has been mounted. Alternatively, the flash file system 102 may perform a polling routine to periodically or aperiodically poll a flash memory device interface (e.g., a flash memory card slot interface) to determine if a flash memory volume has been mounted.

If the flash file system 102 determines that a flash memory volume (e.g., one of the flash memory volumes 404a-d) has been mounted (block 602), then the flash file system 102 performs a volume mount process in response to mounting of a flash memory volume (e.g., the flash memory device 106 of FIG. 1 or one of the flash memory volumes 404a-d of FIG. 4) (block 604). For example, the flash file system 102 may include a function or routine that performs the example process described below in connection with FIG. 7 in response to receiving an interrupt indicating that a flash memory volume has been mounted. The flash file system 102 may perform the example process of FIG. 7 to determine whether to associate the mounted flash memory volume with a shared reclaim thread or with a non-shared reclaim thread and to store sharing information accordingly in the example status data structure 504 of FIG. 1.

The flash file system 102 then sets the reclaim prioritizations for the mounted flash memory volumes (e.g., the flash memory volumes 404a-c of FIG. 4) that share a reclaim thread (block 606). The prioritizations of each of the flash memory volumes 404a-c sharing a reclaim thread may be based on the type of information stored therein. For example, an on-board or embedded flash memory volume storing system may be assigned the highest reclaim priority, while a removable flash memory volume storing media data may have a relatively lower reclaim priority. The exact prioritizations are implementation dependant.

If at block 602 the flash file system 102 determines that a flash memory volume (e.g., one of the flash memory volumes 404a-d of FIG. 4) has not been mounted or after the flash file system 102 sets the reclaim prioritizations (block 606), the memory management module 110 determines the amount of invalid data space (e.g., the logical units 114b and 114d of FIG. 3 having invalid data) in each source block (e.g., each of the source blocks 112a, 112b, and 112d of FIG. 2) of each mounted flash memory volume (e.g., the flash memory volumes 404a-d of FIG. 4) serviced by a reclaim thread (e.g., the thread 402 or 406 of FIG. 4) (block 608).

The reclaim module 116 then determines for each of the serviced flash memory volumes (e.g., the flash memory volumes 404a-d) if any of the source blocks (e.g., the blocks 112a, 112b, and 112d) have an amount of invalid data space that exceeds a threshold value (block 610). The threshold value may be predetermined and representative of the amount of invalid data space that will cause a reclaim operation on a flash memory volume. In some cases, the threshold value may be set such that the amount of invalid data space (e.g., the logical units 114b and 114d having invalid data) does not exceed the amount of valid data space (e.g., the logical units 114a and 114c having valid data and/or the logical units available to receive valid data). The threshold may also be set so that the presence of any invalid data triggers a reclaim operation. For a foreground reclaim thread, the threshold may be set to the amount of space needed to accommodate a pending write operation.

If the reclaim module 116 determines that one or more of the source blocks (e.g., the blocks 112a, 112b, and 112c) has an amount of invalid data space that exceeds the threshold value (block 610), then the memory management module 110 tags or flags those source blocks in each of the flash memory volumes 404a-c (block 612). For example, the memory management module 110 may set a flag (not shown) in a data structure (e.g., the status data structure 504 of FIG. 1) indicating which of the source blocks have exceeded the invalid data threshold value.

The reclaim module 116 then determines if it should perform a reclaim operation (block 614). For example, the reclaim module 116 may determine that it should perform a reclaim operation in response to a reclaim thread (e.g. a background reclaim thread, a foreground reclaim thread, etc.) initiating the reclaim process.

If the reclaim module 116 determines that it should perform a reclaim process (block 614), then the reclaim module 116 initiates a reclaim operation to reclaim the invalid data space (e.g., the data space in the logical units 114b and 114d of FIG. 3) in each one of the marked source blocks (e.g., the blocks 112a, 112b, and 112d) for each of the serviced flash memory volumes (e.g., the flash memory volumes 404a-d) (block 616) using a prioritization reclaim order, if applicable. The reclaim operation may be performed as described above in connection with FIG. 3. If the reclaim thread is a background thread, it may wait until a corresponding processor system (e.g., the processor system 910 of FIG. 9) has been idle for a predetermined amount of time before initiating the reclaim operation. (In example implementations using a background reclaim thread, the reclaim operation may reclaim the invalid data space in flash memory volumes having a relatively high reclaim priority even if the amount of invalid data space is less than another one of the flash memory volumes having a lower reclaim priority.) Although one reclaim operation (block 616) is shown, the reclaim module 116 may perform any number of reclaim operations as required by one or more reclaim threads during operation. In some example implementations, two or more reclaim operations may execute in parallel either synchronously or asynchronously.

If at block 614 the reclaim module 116 determines that it should not perform a reclaim operation or after the reclaim module 116 performs the reclaim operation (block 616), the flash file system 102 determines if a flash memory volume (e.g., one of the flash memory volumes 404a-d of FIG. 4) has been unmounted (block 618). For example, the flash file system 102 may determine that a flash memory volume has been unmounted if it receives a message or other information (e.g., an interrupt) indicating the unmounting of a flash memory volume. If the flash file system 102 determines that a flash memory volume has been unmounted (block 618), the flash file system 102 performs an example flash memory volume unmount process (block 620) such as the example process described below in connection with FIG. 8.

If at block 618 the flash file system 102 determines that a flash memory volume (e.g., one of the flash memory volumes 404a-d of FIG. 4) has not been unmounted or after the flash file system 102 performs a flash memory volume unmount process (block 620), the flash file system 102 determines whether it should continue monitoring flash memory volumes (e.g., one or more of the flash memory volumes 404a-d) and/or flash memory volume interfaces (e.g., flash memory card slot interfaces) (block 622). For example, if the flash file system 102 is powering down, the flash file system 102 may determine that it should not continue monitoring. If the flash file system 102 determines that it should continue monitoring (block 622), control is returned to block 602. Otherwise, the example process of FIG. 6 is ended.

FIG. 7 is a flow diagram representative of example machine readable instructions that may be used to implement an example flash memory volume mount process. The example process of FIG. 7 may be used to implement the operation of block 604 described above in connection with FIG. 6. Initially, the flash interface module 118 obtains a mount message (block 702) indicating that a flash memory volume (e.g., the flash memory volume 404a of FIG. 4) has been mounted. The message may be implemented using an interrupt. Alternatively, the flash interface module 118 may periodically or aperiodically poll a flash memory interface (e.g., a memory card slot interface) to determine if a flash memory device has been mounted.

In response to such a mount message, the memory management module 110 retrieves volume information (block 704) associated with the mounted flash memory volume 404a. For example, the memory management module 110 of FIG. 1 may access the system memory 924 or the mass storage memory 925 of the processor system 910 of FIG. 9 to retrieve information from the reference data structure 502 of FIG. 1. The retrieved information may be associated with sharing reclaim threads, associated with reclaim prioritization (e.g., the type of information stored on the flash memory volume 404a), and/or with any other information associated with configuring the flash memory volume 404a for operation.

The memory management module 110 then determines if the flash memory volume 404a should be associated with a shared reclaim thread (e.g., the reclaim thread 402 of FIG. 4) (block 706) based on the retrieved volume information. That is, the memory management module 110 determines if the flash memory volume 404a should be associated with a reclaim thread (e.g., the reclaim thread 402) that is already assigned to another flash memory volume (e.g., the flash memory volume 404b of FIG. 4) or that may later be assigned to another flash memory volume such that the flash memory volume 404a may at some time during operation share the reclaim thread.

If the memory management module 110 determines that the flash memory volume 404a should be associated with a shared reclaim thread 402 (block 706), then the memory management module 110 identifies the other flash memory volumes (e.g., the flash memory volumes 404b and 404c of FIG. 4) with which the flash memory volume 404a should share the reclaim thread 402 (block 708) based on the retrieved volume information (block 704). The memory management module 110 determines if another flash memory volume (e.g., one of the flash memory volumes 404b or 404c) designated to share the same reclaim thread 402 is already mounted (block 710) based on, for example, the information stored in the status data structure 504 of FIG. 1.

If the memory management module 110 determines that another volume designated to share the same reclaim thread 402 is already mounted (block 710), then the memory management module 110 associates the existing (i.e., already started) shared reclaim thread 402 (e.g., a background reclaim thread) to the recently mounted flash memory volume 404a (block 712). For example, the memory management module 110 may associate the flash memory volume with the existing reclaim thread 402 by updating the status data structure 504 of FIG. 1 (e.g., storing information in the status data structure 504 indicating the association).

If the memory management module 110 determines that the mounted flash memory volume (e.g., the flash memory volume 404d of FIG. 4) should not share a reclaim thread (e.g., the reclaim thread 406 of FIG. 4) (block 706), or if the memory management module 110 determines that another flash memory volume (e.g., one of the flash memory volumes 404b or 404c) designated to share the reclaim thread 402 with the flash memory volume 404a is not mounted (block 710), then the memory management module 110 spawns a new reclaim thread (e.g., a background reclaim thread) (block 714). The memory management module also associates the new reclaim thread with the mounted flash memory volume (e.g., one of the flash memory volumes 404d or 404a) (block 714) by storing information in the status data structure 504 indicative of the association (block 714).

At block 714, if the mounted flash memory volume is a non-shared flash memory volume (e.g., the flash memory volume 404d of FIG. 4), then the memory management module 110 spawns a new reclaim thread (e.g., the thread 406 of FIG. 4) (block 714) that will not be shared with any other flash memory volumes. Otherwise, if the mounted flash memory volume is a shared flash memory volume (e.g., the flash memory volume 404a of FIG. 4), then at block 714 the memory management module 110 spawns a new reclaim thread (e.g., the reclaim thread 402 of FIG. 4) that may be shared with one or more other subsequently mounted shared flash memory volume (e.g., the flash memory volumes 404b or 404c). In some example implementations, the new reclaim thread may be shared with any other flash memory volumes or only with particular flash memory volumes as indicated in the shared volume(s) column 510 (FIG. 5) of the reference data structure 502 (FIG. 1). After associating the mounted flash memory volume with an existing shared reclaim thread (block 712) or with a new reclaim thread (block 714), control is returned to a calling function or process such as, for example, the example process of the FIG. 6, and/or the example process of FIG. 7 is ended.

FIG. 8 is a flow diagram representative of example machine readable instructions that may be used to implement the example flash memory volume unmount operation described above in connection with block 620 of the flow diagram of FIG. 6. Initially, the flash interface module 118 of FIG. 1 obtains a flash volume unmount message (block 802), which may be, for example, an interrupt or information obtained in response to the flash interface module 118 performing a polling routine to poll a flash hardware interface (e.g., a memory card slot interface). The memory management module 110 then determines the identification of the unmounted flash memory module (block 804) based on, for example, the unmount message (block 802).

The memory management module 110 then determines if the unmounted flash memory volume is designated to share a reclaim thread (block 806). For example, the memory management module 110 may compare the identification of the flash memory volume determined at block 804 to the information stored in the status data structure 504 of FIG. 1 to determine if the unmounted flash memory volume was associated with a shared reclaim thread (e.g., the shared reclaim thread 402 of FIG. 4) (block 806).

If the memory management module 110 determines that the unmounted flash memory volume is designated to share a reclaim thread (block 806), then the memory management module 110 determines if another flash memory volume associated with the same reclaim thread is mounted (block 808). For example, if the unmounted flash memory volume is the flash memory volume 404a of FIG. 4, then the memory management module 110 uses the status data structure 504 of FIG. 1 to determine if either of the flash memory volumes 404b or 404c are mounted by determining if entries for those flash memory volumes are stored in the status data structure 504.

If the memory management module 110 determines that another flash memory volume using the shared reclaim thread is mounted (block 808), then the memory management module 110 disassociates the existing reclaim thread (e.g., the reclaim thread 402 of FIG. 4) from the unmounted flash memory volume (e.g., the flash memory volume 404a) (block 810). For example, the memory management module 110 may delete an entry associated with the unmounted flash memory volume from the shared volume(s) column 510 of the status data structure 504 of FIG. 5.

Returning to block 806, if the memory management module 110 determines that the unmounted flash memory volume (e.g., the flash memory volume 404d of FIG. 4) does not share a reclaim thread (e.g., the reclaim thread 406 of FIG. 4) (block 806), or if the memory management module 110 determines that no other flash memory volume (e.g., one of the flash memory volumes 404b or 404c) is currently using or sharing the same reclaim thread (e.g., the reclaim thread 402 of FIG. 4) (block 808), then the memory management module 110 causes the existing reclaim thread (e.g., one of the reclaim threads 402 or 404) that was associated with the unmounted flash memory volume to end (block 812) and the status data structure 504 is updated accordingly. Control is then returned to a calling function or process such as, for example, the example process of the FIG. 6, and/or the example process of FIG. 8 is ended.

Figure 9:
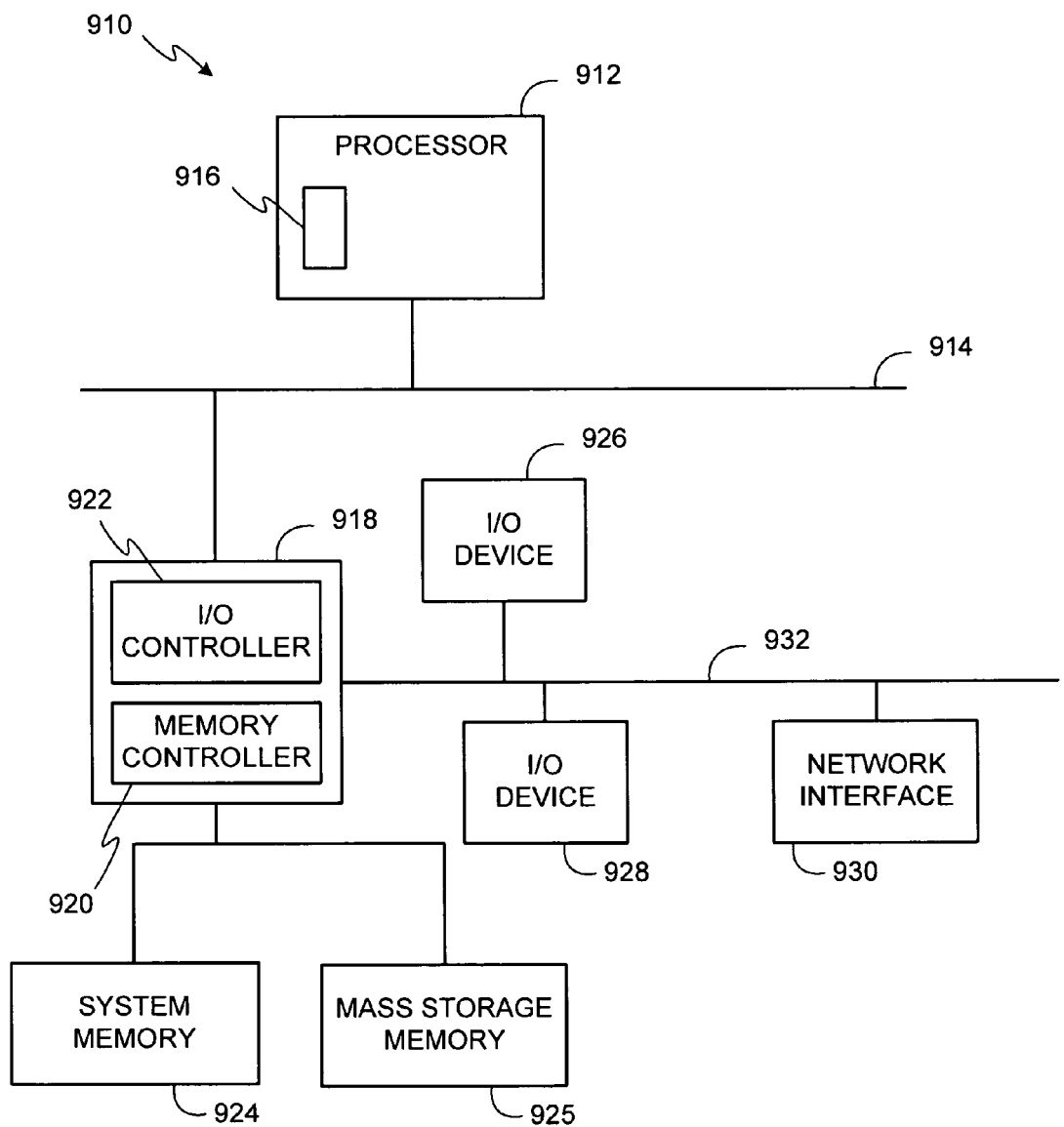
FIG. 9 is an example processor system that may be used to execute the example machine readable instructions of FIGS. 6-8 to implement the example apparatus of FIG. 1.

FIG. 9 is a block diagram of an example processor system 910 that may be used to implement the apparatus and methods described herein. As shown in FIG. 9, the processor system 910 includes a processor 912 that is coupled to an interconnection bus 914. The processor 912 includes a register set or register space 916, which is depicted in FIG. 9 as being entirely on-chip, but which could alternatively be located entirely or partially off-chip and directly coupled to the processor 912 via dedicated electrical connections and/or via the interconnection bus 914. The processor 912 may be any suitable processor, processing unit or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and an input/output (I/O) controller 922. As is well known, a chipset typically provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 925.

The system memory 924 may include any desired type of volatile and/or non-volatile memory such as, for example, static random access memory (SRAM), dynamic random access memory (DRAM), flash memory, read-only memory (ROM), etc. The mass storage memory 925 may include any desired type of mass storage device including hard disk drives, optical drives, tape storage devices, etc.

The I/O controller 922 performs functions that enable the processor 912 to communicate with peripheral input/output (I/O) devices 926 and 928 and a network interface 930 via an I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode (ATM) device, an 802.11 device, a DSL modem, a cable modem, a cellular modem, etc. that enables the processor system 910 to communicate with another processor system.

While the memory controller 920 and the I/O controller 922 are depicted in FIG. 9 as separate functional blocks within the chipset 918, the functions performed by these blocks may be integrated within a single semiconductor circuit or may be implemented using two or more separate integrated circuits.

Although certain methods, systems, and articles of manufacture have been described herein, the scope of coverage of this patent is not limited thereto. To the contrary, this patent covers all methods, systems, and articles of manufacture fairly falling within the scope of the appended claims either literally or under the doctrine of equivalents.

What is claimed is:

1. A method, comprising:
   associating, via a processor, a shared reclaim thread with a first flash memory volume to reclaim memory space in the first flash memory volume;
   detecting a mounting of a second flash memory volume;
   associating the shared reclaim thread with the second flash memory volume to reclaim memory space in the second flash memory volume, wherein the shared reclaim thread is in association with both the first and second flash memory volumes during a time period, the second flash memory volume being mountable and unmountable independent of the first flash memory volume;
   reclaiming the memory space in at least one of the first or second flash memory volumes via the shared reclaim thread; and
   associating a first service priority with the first flash memory volume and a second service priority with the second flash memory volume, wherein the first and second service priorities are indicative of relative priorities associated with performing memory reclaim operations on the first and second flash memory volumes.

2. A method as defined in claim 1, wherein associating the shared reclaim thread with the first and second flash memory volumes further comprises obtaining first information indicative of the mounting of the first flash memory volume prior to associating the shared reclaim thread with the first flash memory volume and second information indicative of the mounting of the second flash memory volume prior to associating the shared reclaim thread with the second flash memory volume.

3. A method as defined in claim 1, wherein the first and second service priorities are selected based on the types of information stored in the first and second flash memory volumes.

4. A method as defined in claim 1, further comprising:
   obtaining information indicative of unmounting one of the first or second flash memory volumes; and
   disassociating the one of the first or second flash memory volumes from the shared reclaim thread.

5. A method as defined in claim 4, further comprising ending the shared reclaim thread if no flash memory volume is mounted or associated with the shared reclaim thread.

6. A method as defined in claim 1, further comprising:
   obtaining information indicative that a third flash memory volume has been mounted; and
   associating the shared reclaim thread with the third flash memory volume during the time period to reclaim memory space in the third flash memory volume.

7. A method as defined in claim 1, wherein associating the shared reclaim thread with the first and second flash memory volumes comprises storing a thread identifier of the shared reclaim thread in a data structure in association with a first memory volume identifier of the first flash memory volume and a second memory volume identifier of the second flash memory volume.

8. A method as defined in claim 1, further comprising, in response to detecting a mounting of a third flash memory volume, determining whether the third flash memory volume is configured to share the shared reclaim thread with at least the first flash memory volume, and when the third flash memory volume is not configured to share the shared reclaim thread with at least the first flash memory volume, associating the third flash memory volume with a second reclaim thread separate from the shared reclaim thread.

9. A method as defined in claim 1, wherein the first flash memory volume corresponds to a first memory device and the second flash memory volume corresponds to a second memory device.

10. An apparatus, comprising:
    a flash interface module to receive volume mounting information indicative of mounting or unmounting of flash memory volumes; and a memory management module to:
  associate a shared reclaim thread with a first flash memory volume to reclaim memory space in the first flash memory volume;
  when the flash interface module detects a mounting of a second flash memory volume, associate the shared reclaim thread with the second flash memory volume to reclaim memory space in the second flash memory volume, the shared reclaim thread being substantially simultaneously in association with both the first and second flash memory volumes, at least one of the flash interface module or the memory management module being implemented using a programmed processor, and the second flash memory volume being mountable and unmountable independent of the first flash memory volume; and
  associate a first service priority with the first flash memory volume and a second service priority with the second flash memory volume, wherein the first and second service priorities are indicative of relative priorities associated with performing memory reclaim operations on the first and second flash memory volumes.

11. An apparatus as defined in claim 10, further comprising a reclaim module to spawn the shared reclaim thread.

12. An apparatus as defined in claim 10, wherein the memory management module obtains information from a system memory indicative of whether the first and second flash memory volumes share the shared reclaim thread to reclaim the memory space.

13. An apparatus as defined in claim 10, wherein the mounting of the second flash memory volume comprises physically connecting a flash memory device to a flash memory interface.

14. An apparatus as defined in claim 10, wherein the first and second service priorities are selected based on the types of information stored in the first and second flash memory volumes.

15. An apparatus as defined in claim 10, wherein the memory management module is further to terminate the shared reclaim thread in response to unmounting of both of the first and second flash memory volumes.

16. An apparatus as defined in claim 10, wherein the memory management module is to associate the shared reclaim thread with the first and second flash memory volumes by storing a thread identifier of the shared reclaim thread in a data structure in association with a first memory volume identifier of the first flash memory volume and a second memory volume identifier of the second flash memory volume.

17. An apparatus as defined in claim 10, wherein the memory management module is configured to, in response to the flash interface module detecting a mounting of a third flash memory volume, determine whether the third flash memory volume is configured to share the shared reclaim thread with at least the first flash memory volume, and when the third flash memory volume is not configured to share the shared reclaim thread with at least the first flash memory volume, associate the third flash memory volume with a second reclaim thread separate from the shared reclaim thread.

18. An apparatus as defined in claim 10, wherein the first flash memory volume corresponds to a first memory device and the second flash memory volume corresponds to a second memory device.

19. A tangible computer readable medium having instructions stored thereon that, when executed, cause a machine to at least:
  associate a shared reclaim thread with a first memory volume to execute a memory space reclaim process on the first memory volume;
  detect a mounting of a second memory volume;
  associate the shared reclaim thread with the second memory volume to reclaim memory space in the second memory volume, wherein the shared reclaim thread is in association with both the first and second memory volumes during a time period, the second memory volume being mountable and unmountable independent of the first memory volume;
  associate a first service priority with the first memory volume and a second service priority with the second memory volume, wherein the first and second service priorities are indicative of relative priorities associated with performing memory reclaim operations on the first and second memory volumes; and
  reclaim memory space in at least one of the first or second memory volumes via the shared reclaim thread.

20. A tangible computer readable medium as defined in claim 19, wherein the first and second memory volumes are flash memory volumes.

21. A tangible computer readable medium as defined in claim 19 having instructions stored thereon that, when executed, cause the machine to:
  determine an amount of invalid memory space in each of the first and second memory volumes;
  compare the amount of invalid memory space associated with each of the first and second memory volumes to a threshold value; and
  reclaim the memory space in at least one of the first or second memory volumes only if the amount of invalid memory space exceeds the threshold value.

22. A tangible computer readable medium as defined in claim 19 having instructions stored thereon that, when executed, cause the machine to:
  obtain information indicative that a third memory volume has been mounted; and
  spawn a new memory reclaim thread to reclaim memory space in the third memory volume.

23. A tangible computer readable medium as defined in claim 19, wherein the first and second service priorities are selected based on the types of information stored in the first and second memory volumes.

24. A tangible computer readable medium as defined in claim 19 having instructions stored thereon that, when executed, cause the machine to associate the shared reclaim thread with the first and second memory volumes by storing a thread identifier of the shared reclaim thread in a data structure in association with a first memory volume identifier of the first memory volume and a second memory volume identifier of the second memory volume.

25. A tangible computer readable medium as defined in claim 19 having instructions stored thereon that, when executed, cause the machine to, in response to detecting a mounting of a third memory volume, determine whether the third memory volume is configured to share the shared reclaim thread with at least the first memory volume, and when the third memory volume is not configured to share the shared reclaim thread with at least the first memory volume, associate the third memory volume with a second reclaim thread separate from the shared reclaim thread.

26. A tangible computer readable medium as defined in claim 19, wherein the first memory volume corresponds to a first memory device and the second memory volume corresponds to a second memory device.

* * * * *